Dec. 8, 1936.　　　A. F. UNDERWOOD　　　2,063,885
LUBRICATION OF CRANKSHAFTS
Filed Dec. 21, 1935

Inventor
Arthur F. Underwood
By Blackmore, Spencer & Flint
Attorneys

Patented Dec. 8, 1936

2,063,885

UNITED STATES PATENT OFFICE 2,063,885

LUBRICATION OF CRANKSHAFTS

Arthur F. Underwood, Detroit, Mich., assignor to General Motors Corporation, Detroit, Mich., a corporation of Delaware Application December 21, 1935, Serial No. 55,598

2 Claims. (Cl. 184—6)

This invention relates to the lubrication of crankshafts and is an improvement on the structure disclosed in the Underwood Patent 1,872,365.

In the crankshaft shown in the patent mentioned all of the crankshaft bearing portions or journals were presumed to be of the same size. However, in practice it has been found that there are instances in which the end journal, for instance, is larger than the other journals, or in some instances it is possible that an intermediate journal may be larger than the end journals. Where one journal of the crankshaft is larger than the other journals, the larger journal, of course, will have a greater peripheral centrifugal force than the smaller journals, and any oil which is in an oil hole in the journal will be thrown out of the passage in the larger journal with a greater centrifugal force than the centrifugal force of the smaller journal. There is accordingly a greater back pressure acting against the conventional pump of the usual force feed lubricating system at the larger journal.

It is the object of the present invention to design the application or placing of the lubricant passages so that the back pressure of the larger journal will be equal to the back pressure of the smaller journals.

Figure 1:
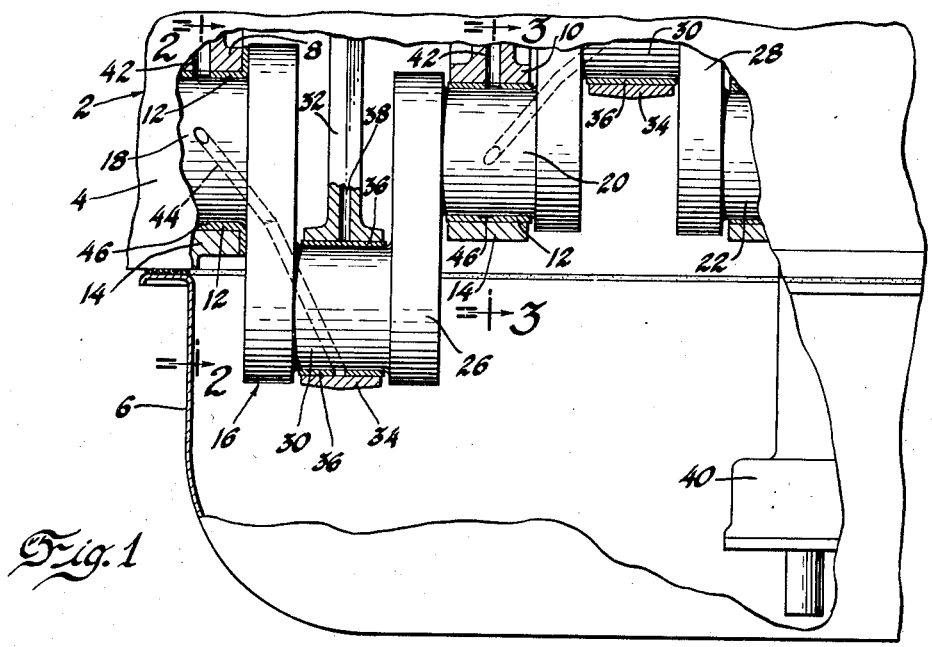
Figure 1 is a sectional view of a portion of an automotive vehicle showing how the invention is applied.

On the drawing, the numeral 2 designates as a whole an internal combustion engine such as is used on automotive vehicles. The engine has the usual crankcase 4, oil pan 6, and in the crankcase there is formed the usual bearing seats 8, 10, etc., in which there are received the usual bearings 12 held in place by the usual bearing caps 14. In the bearings 12 there is received the crankshaft indicated as a whole at 16 and having the journals 18, 20, and 22 and the crank throws 26 and 28, each throw having a crankpin 30. A connecting rod 32 is mounted on each crankpin bearing portion and is held in place by the connecting rod bearing cap 34. In the connecting rod 32 and the cap 34 there are positioned the usual bearings 36. Each connecting rod preferably has the drilled passage 38 by means of which the oil is led to the usual wrist pin bearings.

Ordinarily, all of the crankshaft journals, such as 18, 20, and 22, are of the same size, but it sometimes happens that the end journal is made larger than the other journals. Where this is true the centrifugal force due to the rotation of the crankshaft, such as shown by the radius $r$ in Figure 2, will be greater at the larger journal 18 than for the corresponding radius $r'$ of the intermediate journals 20 and 22 due, of course, to the fact that the radius $r$ is greater. Where there is a difference in size between the end journals such as 18 and the center journals 20 and 22, it is obvious that the back pressure against the usual pump 40 which forces the oil to the bearings through the usual lubricating passages 42 will be greater at the large bearing than at the small bearing. Accordingly, where the oil is to be forced through a passage to the center of the bearing portion of the crankshaft and then to be delivered to a connecting passage leading to the crankpin, the crankpin receiving oil from the larger or end bearing 18 will receive less oil than the crankpins lubricated from the smaller bearings.

The formula for the back pressure acting against the pump pressure due to the centrifugal force of rotation of the crankshaft is as follows:

$$\text{Back pressure} = K(\text{R. P. M.})^2 (r^2 - R^2)$$

Figures 2, 3:
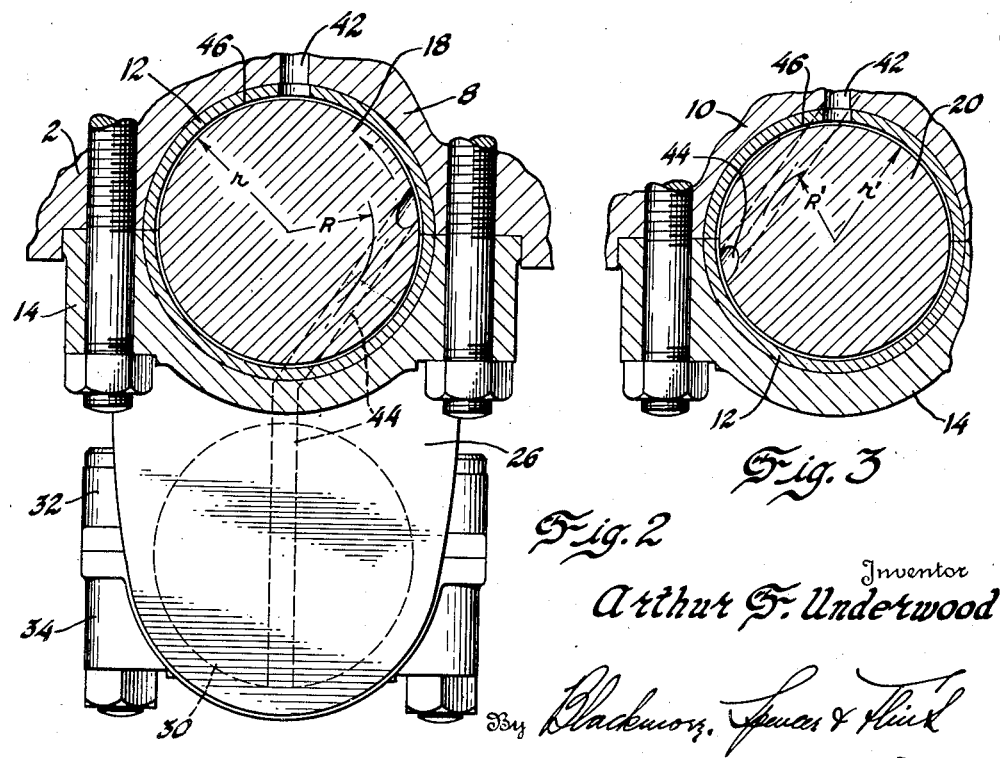
Figure 2 is an enlarged sectional detailed view of the large bearing portion or journal of the crankshaft.
Figure 3 is a corresponding view showing the smaller crankshaft bearing portion or journal.

In the formula K is a constant and $r$ the radius of the journal of the shaft, while R is the radius at which the oil hole is drilled tangent. In order to obtain constant lubrication, therefore, it is necessary that $r^2 - R^2$ is maintained constant for the reason that the constant K and the revolutions per minute are the same for all crankshaft bearings. The manner in which $r^2 - R^2$ is maintained constant is as follows:

The oil passage from the larger journal to the crankpin is indicated at 44 and by referring to Figure 2 it will be noted that this passage is not drilled directly through the center line of the bearing but is at one side thereof. The reason for this is that it decreases the centrifugal force acting backwards against the pump. In Figure 2 it will be noted that $r$ indicates the full radius of the bearing of the crankshaft while R is the effective radius or the radius of the oil passage tangent to the center line of the passage. By so proportioning the radius R with reference to the radius $r$ so that $r^2 - R^2$ is a constant, it is evident that the back pressure at all bearings will be constant. Figure 3 is a section through one of the smaller journals in which the difference between $r'^2$ and $R'^2$ is the same as the difference between $r^2$ and $R^2$ in Figure 2.

The usual oil groove 46 is provided in each bearing.

I claim:

1. In an engine having a crankshaft having a plurality of different sized journals and a plurality of crank arms having crankpins, a passage in each journal passing through the crank arms and leading to a crankpin, each of said passages being positioned off the center line of the crankshaft journal, the difference between the square of the radius of the bearing and the effective radius of the oil passage relative to the center of the shaft being constant for all journals.

2. In an engine having a crankshaft having a plurality of journals and a plurality of crank arms having crankpins, a continuous passage in one of the journals open at its ends only and passing through a crank arm and leading to a crankpin, each of said passages being positioned off the center line of the crankshaft journal.

ARTHUR F. UNDERWOOD.